Oct. 28, 1958    J. S. KANE ET AL    2,858,412
ARC TORCH
Filed July 6, 1956
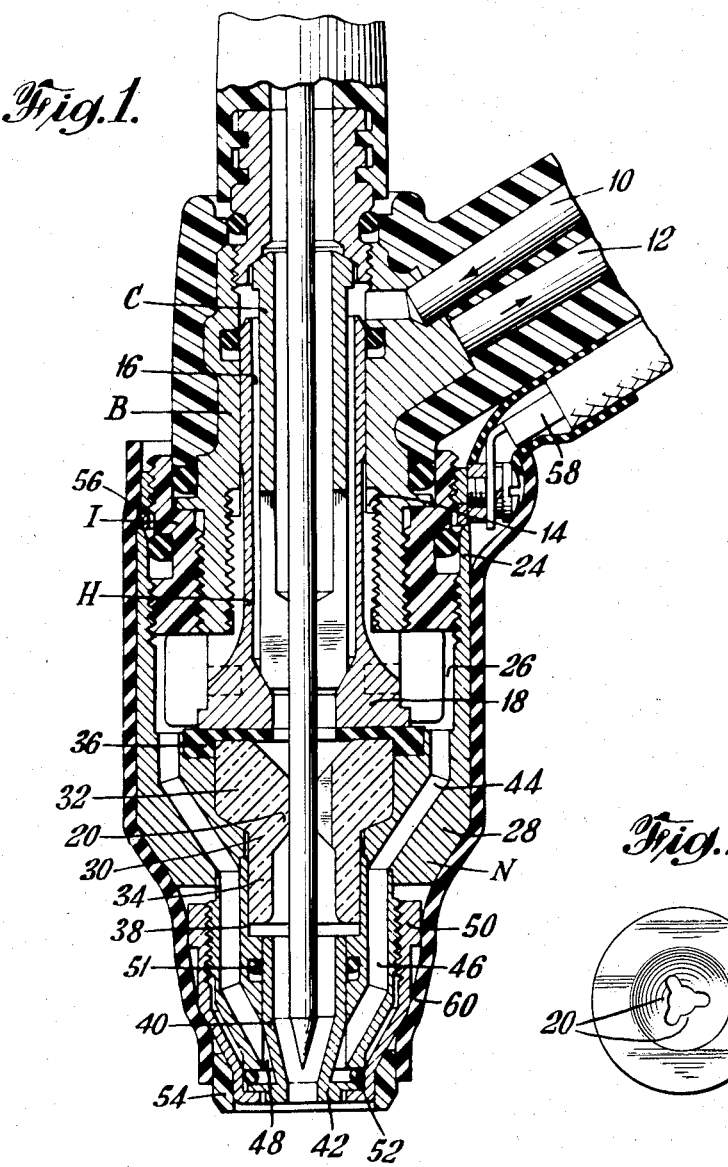
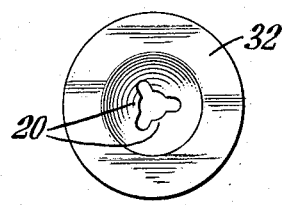
INVENTORS
JOHN S. KANE
CLIFFORD W. HILL
BY Richard S. Shreve
ATTORNEY

United States Patent Office 2,858,412
Patented Oct. 28, 1958

2,858,412

ARC TORCH

John S. Kane, Watchung, and Clifford W. Hill, Mountainside, N. J., assignors to Union Carbide Corporation, a corporation of New York Application July 6, 1956, Serial No. 596,185

19 Claims. (Cl. 219—75)

This invention relates to arc torches of the character disclosed in the copending application of R. M. Gage, U. S. Serial No. 524,353, and has for its principal object to provide an improved torch for carrying out the process disclosed therein.

This is a transferred type high pressure electric arc torch provided with a nozzle having a non-consumable solid walled passage for laterally constricting the arc and gases and then discharging the resultant current-carrying effluent which is stable, directional and shaped to follow a well-defined path corresponding to the geometry of such passage.

Other objects of the present invention are to provide effective insulation between the nozzle and the electrode holder, and between the nozzle and electrode to prevent the pilot arc from passing other than between the electrode and the orifice wall, to provide a cooling jacket for the orifice wall, to provide cooling fluid passage means inside the torch body and nozzle for supplying cooling fluid to said cooling jacket, and to positively center the electrode with respect to the outlet orifice of said wall in order to obtain the desired high quality cuts.

The gas shielded arc cutting torch comprises a torch body, an electrode holder carried by said torch body, a gas directing nozzle carried by said torch body but insulated therefrom and extending below said electrode holder, a replaceable orifice wall in said nozzle having an orifice small enough to constrict the arc from the electrode, and gas passage means extending from an inlet in said body through the torch to said arc constricting orifice.

According to the present invention a water jacket is provided for the orifice wall, and an annular refractory ceramic liner is provided inside the nozzle below the electrode holder to prevent the pilot arc from passing other than between the orifice wall and the electrode. Preferably the ceramic insert is provided with internal bearings to center the electrode. The nozzle preferably forms a water jacket outside of the electrode holder and above the ceramic liner, and the nozzle has passages therebelow communicating with the water jacket for the orifice wall.

In the drawings:

Fig. 1 is a vertical cross section through an arc torch according to the preferred embodiment of the present invention; and Fig. 2 is a plan of the electrode centering ceramic liner.

The torch comprises a body B having a bore the lower end of which is threaded to receive an electrode holder or collet body H. A collet C inside the holder H bears against an abutment in the top of the torch body B, and the holder H has a conical inner bottom surface to constrict the collet C when the holder H is screwed into the body B. An insulating ring I is screwed onto the outside of the bottom of the torch body B and a nozzle or orifice wall holder N is screwed onto the outside of the insulation I.

The torch body B is of the type shown in Behnke et al. U. S. Patent No. 2,685,632, and has an inlet 10 for shielding gas which opens into an annular chamber between the collet head and the top of the electrode holder H, from which the gas flows down inside the holder and outside the collet, then in through the collet slots on through the bottom of the holder. The torch body B also has an inlet 12 for cooling water from which passages not shown lead to an annular groove 14 in the torch body. The lead-in conduit for the welding current is extended through the water outlet hose, as shown in said patent.

The electrode holder or collet body H comprises an upper tubular portion 16 substantially coextensive with the collet, and a collar portion 18 below the bottom of the torch body B and larger than the bore therein. Longitudinal grooves 22 formed in the tubular portion 16 and the collar portion 18 connect the torch body groove 14 with the space below the torch body B. In assembly, after the holder H is screwed into the body B, baffle plugs 17 are inserted in selected grooves 22 to locate the plugs 17 to form baffles between the inlet 12 and the outgoing water.

The nozzle or orifice wall support N comprises an upper outer sleeve portion 24 which is screwed onto the insulating ring I and extends therebelow for the depth of the collar portion 18 to enclose a water jacket 26. Below the water jacket the nozzle comprises a thick walled body portion 28 having a central bore of upper larger and lower smaller diameter to receive a refractory ceramic insulating liner 30. The liner 30 comprises an upper head portion 32 underlying the collar 18, and having a conical entrance top, and a lower sleeve portion 34 of substantially the same inner diameter as the collar 18 and aligned therewith. The larger size of the ceramic head portion 32 decreases the air gap, and provides an extended insulation against the pilot arc current to insure discharge only at the wall member 42. The conical top facilitates entrance of the electrode and also the shielding gas.

The head portion 32 has bearings 20 projecting inwardly in the bore thereof for centering and guiding the electrode. The bearings 20 preferably have approximately three thousandths of an inch clearance around the electrode, and extend only about half way down the length of the insulating liner bore in order to provide additional gap to prevent internal arcing of both high frequency and pilot arc current between the electrode and insert holder assembly. This insures pilot arc discharge in close proximity to the end of the electrode to initiate the constricted cutting arc.

The water jacket 26 is sealed by a compressible gasket 36 fitted onto an annular shoulder formed by the top of the thick walled portion 28. The gasket 36 is of insulating material, and extends inwardly over the top of the head portion 32, to cover the entire lower surface of the collar 18 and eliminate any tendency for the high frequency current to arc therefrom to the insert holder portion 28. The gasket 36 is compressed against the bottom of the collar portion 18 when the nozzle sleeve portion 24 is screwed onto the insulation ring I.

Below the nozzle portion 28 is a smaller portion or orifice wall holder 38, which is smaller for visibility purposes in using the torch. This smaller portion has a bore aligned with the holder collar portion 18 and which receives the ceramic sleeve 34.

The nozzle N, preferably the portion 38, is provided with a replaceable orifice wall 40. The pilot arc is struck between this wall 40 and the electrode. The wall 40 may be electrically conductive, or it may be of heat resisting insulating material when a suitable probe is provided to pass the pilot arc from the nozzle portion 38 through the wall 40 to the electrode.

In the embodiment shown, the wall 40 constitutes a removable insert in the lower end of the bore in the portion 38, and comprises an upper tubular portion and a lower tapered portion terminating in a head or rim 42. For larger sizes of electrode, the taper may be omitted to provide an entirely tubular bore.

The thick walled nozzle portion 28 is drilled to form passages 44 leading from the water jacket 26, and the insert holder portion 38 is drilled to form passages 46 registering with the passages 44 when the holder portion 38 is secured to the thick walled portion 28 as by means of silver solder. The parts 28 and 38 are made separately only to facilitate machining. These passages 46 communicate with the water jacket 48 which surrounds the orifice wall 40. In the form shown the water jacket is formed between the tapered portion of the insert 40 and the inside of the bore in the insert holder.

An insert retaining cap nut 50 is screwed onto the outside of the insert holder 38 and has an inturned rim underlying the insert head 42. The bore of the insert holder 38 is provided with a groove to receive an "O" ring 51 through which the upper tubular portion of the insert 40 passes when the insert enters the bore. A heat resistant gasket 52 is compressed against the bottom of the insert holder 38 by the insert head 42 when the nut 50 is tightened. The outside rim of the nut 50 is provided with a ring 54 of insulating material to prevent arcing therefrom to the work.

A lead-in ring 56 of conductive material is clamped between the nozzle sleeve portion 24 and the insulating ring I, and carries a binding post for connection thereto of a conduit 58 for high frequency starting current. By virtue of the ceramic liner 30, the nozzle portions 24 and 28 are insulated from the electrode holder H, and a pilot arc is established between the insert 40 and the tip of the electrode E.

The outside of the nozzle N is covered by a flexible rubber sheath or boot 60 which covers the lead in ring 56, and which can be rolled up for access to the cap nut 50 for replacing the insert 40.

This application is in part a continuation of our copending application Serial No. 540,927, filed October 17, 1955.

What is claimed is:

1. Gas shielded arc torch comprising a torch body, an electrode holder carried by said torch body, an annular refractory member below said electrode holder having a central bore through which the electrode depends, a gas directing nozzle surrounding said annular refractory member having therebelow a solid walled arc shaping and directing passage aligned with the electrode, gas passage means extending to said nozzle passage, and an electrical conductor connected to said nozzle whereby an arc may be struck between the tip of said electrode and the portion of said nozzle below said annular refractory member.

2. Gas shielded arc torch comprising a torch body, an electrode holder carried by said torch body, a gas directing nozzle carried by said torch body and extending therebelow to an orifice aligned with the electrode and located below the tip thereof and small enough to constrict the arc therefrom, a cooling jacket inside said nozzle aligned with said orifice and said electrode, and cooling fluid passage means entirely inside the confines of said torch body and said nozzle for passing cooling fluid to said cooling jacket.

3. Gas shielded arc torch comprising a torch body, an electrode holder carried by said torch body, an annular cooling jacket surrounding at least the lower portion of said electrode holder, a gas directing nozzle extending below said cooling jacket to an orifice aligned with the electrode and located below the tip thereof and small enough to constrict the arc therefrom, a lower annular cooling jacket in said nozzle aligned with said orifice, and cooling fluid passage means entirely inside the confines of said nozzle for passing cooling fluid between said cooling jackets.

4. Gas shielded arc torch comprising a torch body, an electrode holder carried by said torch body, an annular refractory member below said electrode holder having a central bore through which the electrode depends, a gas directing nozzle surrounding said annular refractory member, a removable insert in said nozzle below said annular refractory member and having a solid walled arc shaping and directing passage aligned with the electrode, an annular cooling jacket in said nozzle surrounding said insert and aligned with the bore of said refractory member, means for supplying gas through the bore of said refractory member to said nozzle, and means for supplying cooling medium to said annular jacket.

5. Gas shielded arc torch comprising an electrode holder for a stationary electrode, a gas directing nozzle insulated and extending below said electrode holder, circumferentially spaced refractory abutments inside said nozzle below said holder for centering said stationary electrode, said nozzle having an orifice small enough to constrict the arc from the electrode, and gas passage means extending through the spaces between said abutments to said arc constricting orifice.

6. Gas shielded arc torch comprising a torch body an electrode holder in said body, a gas directing nozzle insulated from said body and extending below said electrode holder, a removable insert in said nozzle having a solid walled arc shaping and directing passage below the arcing tip of the electrode, gas passage means extending from an inlet in said torch body to said arc shaping passage, a water jacket for said removable insert in the bottom of said nozzle, and water passage means extending from an inlet in said body for supplying cooling water to said jacket.

7. Gas shielded arc torch comprising a torch comprising a torch body, an electrode holder, a gas directing nozzle insulated from said torch body and extending below said electrode holder, an annular refractory ceramic liner inside said nozzle below said holder and having bearings extending inwardly for centering the electrode, and gas passage means extending from an inlet in said torch body through said electrode holder and annular ceramic insulator and between the bearings thereof to the nozzle orifice.

8. Gas shielded arc torch comprising a torch body, an electrode holder carried by said torch body, a gas directing nozzle carried by said torch body but insulated therefrom and extending below said electrode holder, an annular refractory ceramic liner inside said nozzle below said holder and having bearings extending inwardly for centering the electrode, a replaceable orifice wall in said nozzle below said annular ceramic insulator and having an orifice small enough to constrict the arc from the electrode, and gas passage means extending from an inlet in said torch body through said electrode holder and annular ceramic insulator to said arc constricting orifice.

9. Gas shielded arc torch comprising a torch body, an electrode holder carried by said torch body, a gas directing nozzle carried by said torch body but insulated therefrom and extending below said holder, an annular refractory ceramic liner inside said nozzle below said holder and having bearings extending inwardly for centering the electrode, a compressible insulating gasket between said holder and said ceramic liner forming a water jacket outside of said holder and inside said nozzle, and gas passage means extending from an inlet in said torch body through said electrode holder, ceramic insulator and compressible gasket to the nozzle orifice.

10. Gas shielded arc cutting torch comprising a torch body, an electrode holder carried by said torch body, a gas directing nozzle carried by said torch body but insulated therefrom and extending below said holder, a refractory insert having bearings inside said nozzle below said holder for centering the electrode, a water jacket outside of said holder and inside said nozzle, a replaceable orifice wall in said nozzle below said holder having an orifice small enough to constrict the arc from the electrode, a water jacket in said nozzle outside of said orifice wall, said nozzle having passages outside of said insert connecting said water jackets, and gas passage means extending from an inlet in said torch body through said water jackets to said arc constricting orifice.

11. Gas shielded arch torch comprising a torch body, an electrode holder carried by said torch body, a gas directing nozzle carried by said torch body but insulated therefrom and extending below said electrode holder, a replaceable electrically conductive insert in said nozzle having an orifice small enough to constrict the arc from the electrode, said nozzle having an internal water jacket for said insert and water passages extending through said body and inside said nozzle for supplying cooling water to said jacket, and gas passage means extending from an inlet on said body through the torch to said arc constricting orifice.

12. Gas shielded arch torch comprising a torch body, an electrode holder carried by said torch body, a gas directing nozzle carried by said body but insulated therefrom and extending below said electrode holder, a replaceable electrically conductive insert in said nozzle having an orifice small enough to constrict the arc from the electrode, gas passage means extending from an inlet in said body through the torch to said arc constricting orifice, said insert and nozzle having cooperating portions forming a water jacket for said insert, and means extending through said body and inside said nozzle for supplying cooling water to said jacket.

13. Gas shielded arc torch comprising a torch body, an electrode holder carried by said torch body, a gas directing nozzle carried by said torch body but insulated therefrom and extending below said electrode holder, an annular refractory ceramic liner inside said nozzle below said holder, and gas passage means extending from an inlet in said torch body through said electrode holder and annular ceramic insulator to the nozzle orifice.

14. Gas shielded arch torch comprising a torch body, an electrode holder carried by said torch body, a gas directing nozzle carried by said torch body but insulated therefrom and extending below said electrode holder, an annular refractory ceramic liner inside said nozzle below said holder, a replaceable electrically conductive insert in said nozzle below said annular ceramic insulator and having an orifice small enough to constrict the arc from the electrode, and gas passage means extending from an inlet in said torch body through said electrode holder and annular ceramic insulator to said arc constricting orifice.

15. Gas shielded arc torch comprising a torch body, an electrode holder carried by said torch body, a gas directing nozzle carried by said torch body but insulated therefrom and extending below said holder, an annular refractory ceramic liner inside said nozzle below said holder, a compressible gasket between said holder and said ceramic liner forming a water jacket outside of said holder and inside said nozzle, and gas passage means extending from an inlet in said torch body through said electrode holder, ceramic insulator and compressible gasket to the nozzle orifice.

16. Gas shielded arc torch comprising a torch body, an electrode holder carried by said torch body, a gas directing nozzle carried by said torch body but insulated therefrom and extending below said holder, a water jacket outside of said holder and inside said nozzle, a replaceable electrically conductive insert in said nozzle below said holder having an orifice small enough to constrict the arc from the electrode, a water jacket in said nozzle outside of said insert, said nozzle having passages outside of said insert connecting said water jackets, and gas passage means extending from an inlet in said torch body through said water jackets to said arc constricting orifice.

17. Gas shielded arc torch comprising a torch body, an electrode holder carried by said torch body, a gas directing nozzle carried by said torch body but insulated therefrom and extending below said electrode holder, a replaceable electrically conductive insert in said nozzle having an orifice small enough to constrict the arc from the electrode, said nozzle comprising a thick walled upper portion and a smaller lower portion containing a water jacket for said insert, said thick walled upper portion and said smaller lower portion having drillings therein communicating with said water jacket, and water passage means in said body for supplying cooling water to said drillings.

18. Gas shielded arc torch comprising a torch body, an electrode holder carried by said body, a gas directing nozzle carried by said torch body but insulated therefrom and extending below said electrode holder, an annular refractory ceramic liner inside said nozzle comprising a lower sleeve portion having a central bore aligned with the bore of the electrode holder, and an enlarged portion thereabove underlying the base of said electrode holder, and gas passage means extending from an inlet in said torch body through said aligned bores to the nozzle orifice.

19. Gas shielded arc torch comprising a torch body, an electrode holder carried by said torch body, a gas directing nozzle carried by said torch body but insulated therefrom and extending below said electrode holder, an annular refractory ceramic liner inside said nozzle below said holder, said nozzle comprising a thick walled portion having a central bore of upper larger and lower smaller diameters, and said refractory liner having corresponding diameters received in said bore, and gas passage means extending from an inlet in said torch body through said electrode holder and annular ceramic insulator to the nozzle orifice.

References Cited in the file of this patent

UNITED STATES PATENTS

| | | |
|---|---|---|
| 1,708,003 | Weinman | Apr. 9, 1929 |
| 2,587,331 | Jordan | Feb. 26, 1952 |
| 2,673,278 | Anderson | Mar. 23, 1954 |
| 2,683,791 | Ruehlemann et al. | July 13, 1954 |
| 2,686,860 | Buck et al. | Aug. 17, 1954 |
| 2,726,310 | Brille | Dec. 6, 1955 |
| 2,727,126 | Guest et al. | Dec. 13, 1955 |
| 2,727,970 | Turbett | Dec. 20, 1955 |